Aug. 29, 1967 L. H. RIZZI 3,339,200
PULSE COUPLING NETWORK
Filed Feb. 1, 1966
2 Sheets-Sheet 1
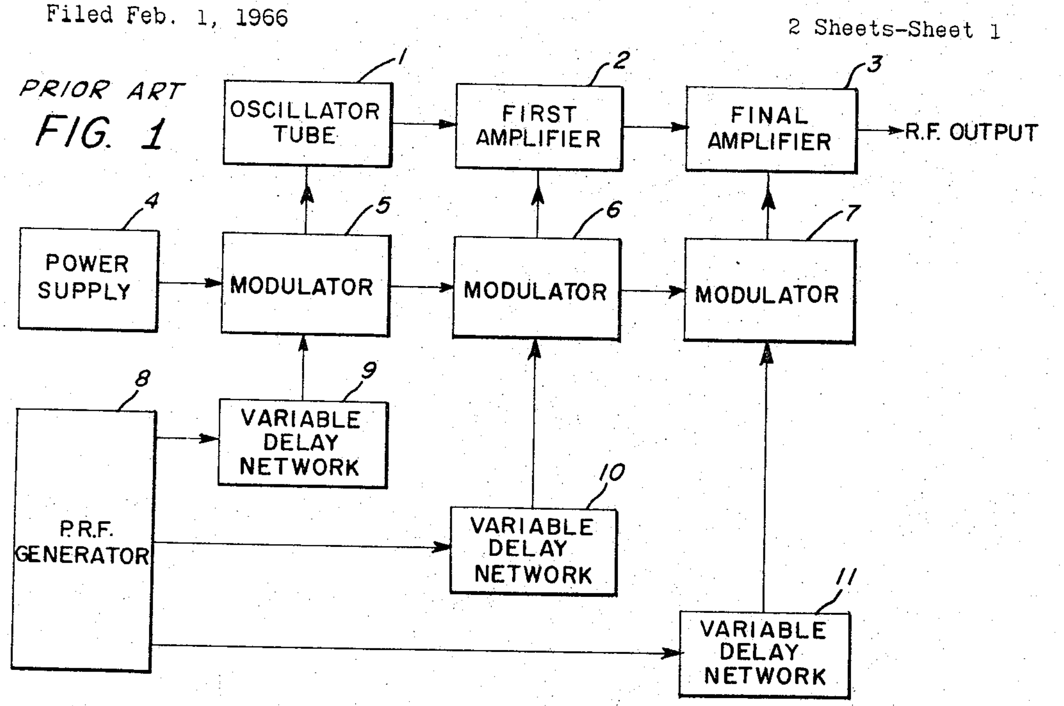
PRIOR ART FIG. 1
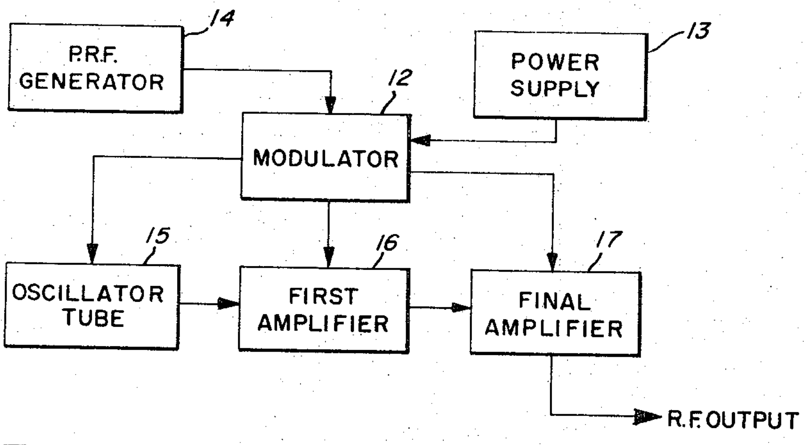
FIG. 2
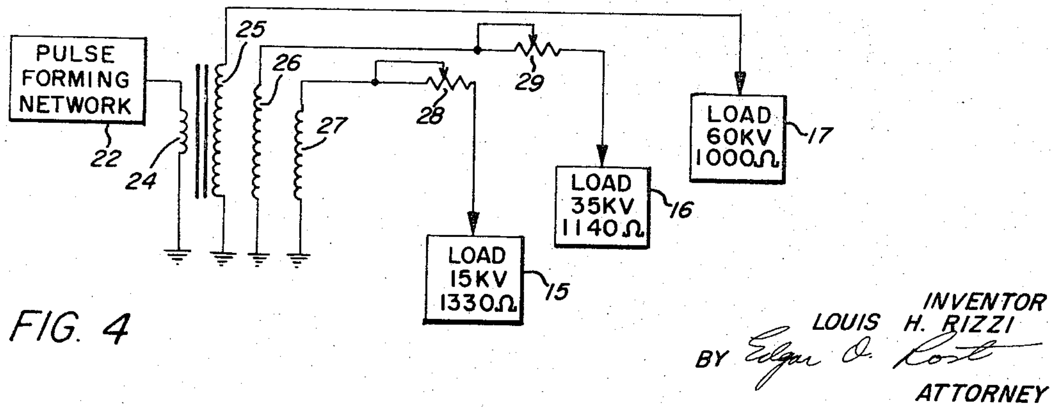
FIG. 4
INVENTOR
LOUIS H. RIZZI
BY Edgar O. Rost
ATTORNEY INVENTOR
LOUIS H. RIZZI
BY Edgar O. Rost
ATTORNEY

United States Patent Office 3,339,200
Patented Aug. 29, 1967

3,339,200
PULSE COUPLING NETWORK

Louis H. Rizzi, Framingham, Mass., assignor to Raytheon Company, Lexington, Mass., a corporation of Delaware
Filed Feb. 1, 1966, Ser. No. 524,090
7 Claims. (Cl. 343—17.1)

ABSTRACT OF THE DISCLOSURE

A pulsed energy transfer system for high power microwave energy generators including a primary current coupling means and a plurality of bifilar mutually electrically isolated secondary transformer windings inductively coupled to the primary coil. High frequency multiple load chains including a plurality of oscillator and amplifier means may be operated with a single pulse power supply utilizing the impedance coupling network of the invention. Synchronization of the successive pulses driving the individual components is simplified and less average powers are required for the energy generated by the overall chain system.

The present invention relates generally to high-power, high-voltage pulsed electrical energy transfer systems and specifically to circuit means for coupling a single pulse power generation source to a plurality of microwave devices in a so-called RF amplifier chain for the generation and amplification of high frequency output pulses.

Energy transfer systems in the microwave region require the generation of successive pulses of very short time duration and predetermined shape to be fed to oscillator devices generally of the magnetron type to result in RF output transmission signals propagated into space by means of an antenna. The pulse generators for such oscillator devices are commonly referred to as pulsers or modulators. With the requirement for higher microwave power generation imposed by present day radar systems which may be beyond the capability of the conventional signal generators, it has been determined in the art that a series or chain of driver-amplifiers may be coupled together to collectively provide a multiple-load transmitter with the output of each element in the chain providing an RF output to the succeeding stage to gentrate radar signals having millions of watts of power. It is common in such prior art systems for each driver and amplifier in the chain to be provided with a separate independent modulator which requires extremely elaborate circuitry for the control of the various voltages, impedances and pulse widths. The time for the initiation of the pulses to operate the chain members is also of paramount importance to ensure the proper drive conditions over the range of the relatively short pulses available. Stable delay networks are utilized to synchronize the start of the pulses of each stage of the chain with overlapping of the voltage pulses required to satisfy the starting conditions for each component of the overall chain system.

The present invention is directed to the provision of a single modulator multiple impedance coupling network for the operation of an RF driver-amplifier chain utilizing a single pulse power supply. A primary advantage of the present invention is the reduction of the number of components and circuits required for activating the in-individual microwave components in the overall chain system. A further advantage resides in simplified control of the overlapping of the RF pulses fed to the individual microwave components as well as a higher efficiency since the microwave tubes are operated with less average power required for each pulse generated. Further, the problem of synchronization of the timing of the successive pulses is eliminated since only one modulator and coupling network is envisaged.

In the pulse generation art two types of modulators are commonly employed. The hard-tube type utilizes a small fraction of the stored energy which is discharged into the load. A second and more widely accepted type is the so-called line-type modulator wherein all of the stored energy is discharged for the generation of pulses transmitted to the load. In the latter type the energy storage device which is comparable to a lumped-constant transmission line and may incorporate current-fed networks or voltage-fed networks. Since the overwhelming number of radar systems in present use commonly employ the voltage-fed network in line-type modulators, the present invention will be illustrated and described with reference to such networks. Other objects, features and advantages of the present invention and embodiments thereof will be apparent after consideration of the following detailed description together with the accompanying drawings in which:

FIG. 1 is a block diagram of a representative microwave driver-amplifier chain employed in prior art pulsed radar systems;

FIG. 2 is a block diagram illustrative of the embodiment of the present invention;

FIG. 4 is a schematic circuit diagram of the multiple impedance pulse coupling network of the present invention;

Figure 7:
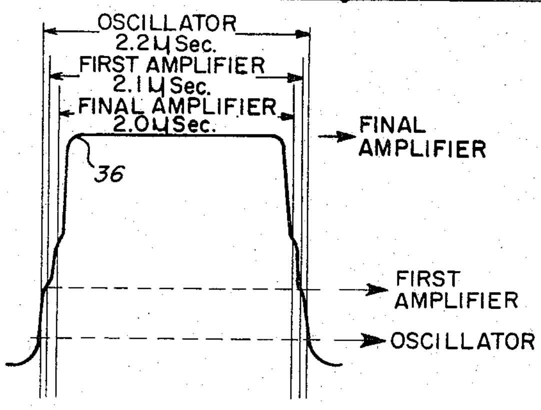

And FIG. 7 is a pictorial representation of the RF output signal waveform from an RF amplifier chain utilizing the embodiment of the invention.

In recent years a microwave device which has achieved importance and enabled the generation of high power radar pulses is the Amplitron which is a broad band crossed-field amplifier having high efficiencies in the range of 50–70 percent. This class of tubes comprises a circular, non-reentrant dispersive network matched at both ends over the frequency band together with a reentrant electron beam emanating from a continuously coated cathode disposed coaxially to the network. A DC potential is applied between the cathode and anode and a magnetic field is applied parallel to the axis of the cathode and transverse to the electric field between the anode and cathode. Such devices when employed as amplifiers exhibit unidirectional properties in that a signal passing through the device in one direction is amplified, while in the reverse direction the network is passive when exposed to the signal. When such devices are driven by RF oscillators such as a magnetron to achieve high peak and average power output pulses over a predetermined frequency band, amplification of the RF energy generated by the first stage may be enhanced by a large factor, depending upon the appropriate electrical and magnetic parameters selected as well as the matching of the oscillator stage and subsequent amplifier components. A further detailed description of the subject Amplitron class of devices may be found in United States Letters Patent No. 2,673,306, issued Mar. 23, 1954 to W. C. Brown and assigned to the assignee of the present invention. The crossed-field devices of the type described are therefore essentially two terminal devices which may function as a saturated amplifier or a self-excited stabilized or unstabilized oscillator, depending upon the applied input radio frequency pulses and circuitry associated therewith. In the embodiment shown in United States Letters Patent No. 2,977,502 issued Mar. 28, 1961, to William C. Brown et al. and assigned to the assignee of the present invention an example of a crossed-field oscillator of the Amplitron type is disclosed. The invention therefore, while describing specific oscillators and/or amplifiers, is not intended to be limited to such configurations and will be equally applicable to any RF amplifier chain system incorporating traveling wave tubes and/or klystrons as well as any other multiple pulse generation and amplification means employed in electron accelerator systems. Further, any combination of microwave oscillators and amplifiers in the respective stages of the RF chain system will be permissible within the precepts encompassed by the present invention.

Referring to the drawings, FIG. 1 diagrammatically illustrates a conventional system for multiple-load applications. A driver tube, preferably of the magnetron type, is coupled in series RF-wise with a first amplifier 2 and final amplifier 3 to generate an RF output for pulse radar signal transmission to collectively define the RF chain. Each of the respective tubes in the chain is provided with a modulator designated respectively 5, 6 and 7 with either a common DC or AC power supply source 4 which would place a high voltage requirement on such a supply. Alternatively, each modulator may be provided with its own independent power source. Pulse repetition frequency generator 8 is provided with multiple outputs having a minimum time base jitter with respect to each other. Each of the outputs is coupled to stable, variable time delay networks 9, 10 and 11 which are respectively interconnected to the modulators 5, 6 and 7. The time delay networks are required to synchronize the start of the pulses in each succeeding stage of the overall chain to ensure proper overlapping of the RF pulses. In addition, the conventional prior art system requires means for the correction of changes in delay time caused by thermal drift, component aging and other system variables.

Referring next to FIG. 2, the block diagram illustrates the multiple load pulse coupling network of the invention. In this embodiment a single modulator 12 together with the accompanying power supply 13 and a single output pulse repetition frequency generator 14 controls the pulsing of the RF amplifier chain incorporating the oscillator or driver tube 15 together with the succeeding stages including a first amplifier 16 and final stage 17. The simplification of the present embodiment of the invention over the prior art will be immediately evident in that all time delay networks have been eliminated and fewer components as well as circuitry have resulted. The accompanying reduction of cost in manufacture, installation and maintenance over conventional pulsating systems requiring multiple modulators will also become apparent.

Figure 3:
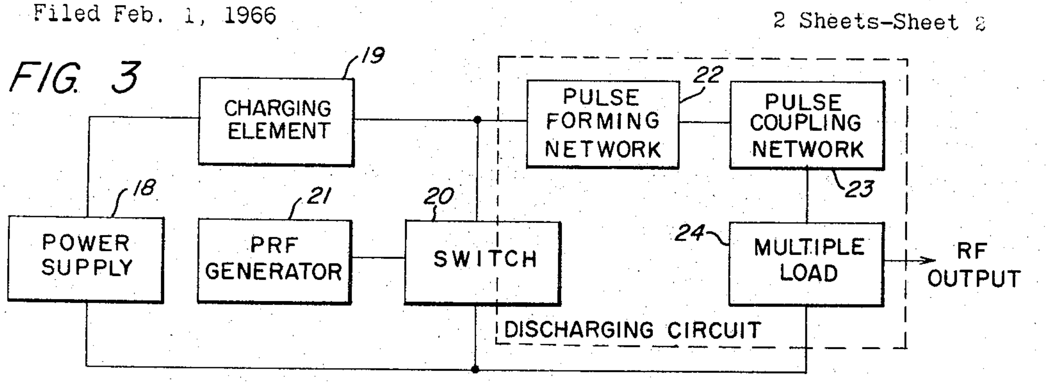
FIG. 3 illustrates in a block diagram the basic circuit components of a line-type modulator.

The details of the present invention will now be described, reference being directed to FIGS. 3 and 4. In the line-type pulse modulator the generation of voltage pulses requires the initial storage of the required voltage and current in a charging circuit comprising a power supply 18 and a charging element 19 which may be either of the capacitance or inductance type. Since the over-all modulator is essentially a high-power device the charging circuit is designed for high efficiency. The charging element also functions as an isolator of the power supply from the switch 20 during the times the generated pulse is transmitted to the load. The pulse repetition frequency generator which is also a well known component and need not be described in detail for the purposes of this disclosure is indicated at 21. Since the teachings of the present invention are directed to the coupling of the generated voltage pulses to a multiple-impedance load, the discharging circuit of the over-all line-type modulator will be involved. This circuit comprises a pulse forming a network 22 which stores the required amount of energy for a single pulse and assures the proper formation and shaping of the generated pulses each time the circuit is discharged. In radar systems such pulses are generally rectangular or trapezoidal. Switch 20 controls this circuit and the pulse coupling network 23 is connected between the pulse forming network 22 and load 24 to thereby transform the generated voltage pulse into the required voltages, impedances and pulse width parameters for each component of the load. For the purposes of this illustration the load 24 is intended to depict the collective RF chain load for the formation of RF output pulses. Ideally, for higher efficient operation the multiple-load impedances must be matched to the pulse forming network impedance and the pulse coupling network employed achieves this function by means of a transformer with primary and secondary inductances with a voltage stepup ratio of several times the primary voltage or in some instances a factor as high as ten.

In the present invention, as shown in FIG. 4, the new approach to the problem of coupling intermittent voltage pulses is achieved in that a primary winding 24 has associated therewith a plurality of mutually electrically isolated voltage step-up means comprising secondary windings wound upon each other in a bifilar manner. The secondary windings may be insulated by any well known means such as the use of a coating sold under the trade name Formvar for each of the secondary windings. Each of the secondary windings has a different impedance ratio with the primary transformer winding and hence a different voltage output. In the illustrative embodiment a three component load has been indicated and therefore the secondary windings 25, 26 and 27 are shown. The respective loads have been designated in a similar manner as shown in FIG. 2, namely loads 15, 16 and 17 serially connected RF-wise to each of the secondary windings. Utilizing the voltage and current characteristics of the respective loads it is possible to determine the pulse parameters required for the operation of the multiple load. The desired overlapping of the RF output pulses for each stage is automatically provided as well as a voltage pulse of proper amplitude, width and impedance for each tube in the chain by variable resistance means 28 and 29 serially connected between the respective secondary windings and the load. Taking into consideration that the load characteristics are known, these values may be used to gain the overdrive of pulses in the separate series-connected branch circuits including the secondary transformer windings and variable resistors. A combined RF output pulse waveform will result from the amplifier chain having essentially a stepped configuration along the leading edge and trailing edge. This technique of starting with the load impedances and voltage requirements to evolve the transformer and pulse forming network requirements is followed throughout as will be hereinafter evident.

Figure 6:
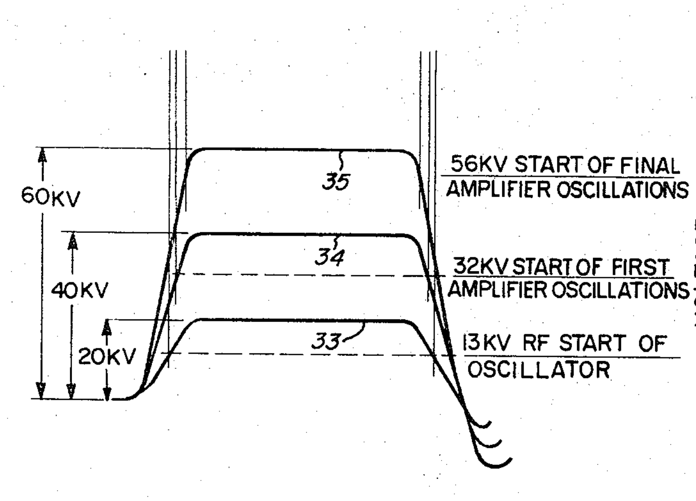
FIG. 6 is a pictorial representation of the pulse amplitude of the network pulse waveform.
Figure 5:
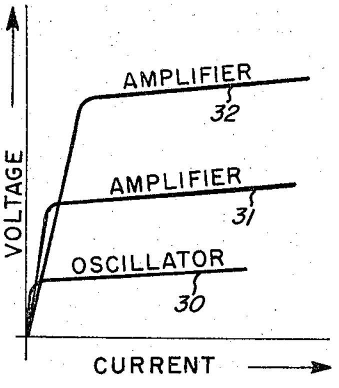
FIG. 5 is a chart illustrating the typical EI characteristics of microwave devices employed in RF amplifier chain systems.

To further illustrate the method of practicing the invention illustrative voltage and current characteristics of crossed-field devices commonly employed in an RF amplifier chain are illustrated in FIG. 5. The driver or oscillator tube, specifically a magnetron, results in the lower curve 30 while the first amplifier is illustratively shown as curve 31 and the final amplifier stage is indicated by the curve 32. FIG. 6 indicates the multiple voltage pulse amplitudes and FIG. 7 illustrates the combined RF output pulse waveform. To initiate oscillation of a selected magnetron it has been determined from EI curve 30 that approximately 13 kilovolts are required to commence the drawing of anode current. For maximum efficiency, then, it is desirable to provide a voltage pulse amplitude from the secondary winding 27 well above the starting voltage requirement and result in an RF output pulse for the next component which overlaps or is produced before the voltage pulse on the next component reaches the level required for operation. The magnetron oscillator is a dissipative or nonlinear load and the peak voltage, to assure operation overdrive of most commonly employed types, will be 15 kilovolts and a current of 15 amperes. To provide the overlapping feature of RF pulses before the succeeding amplifier operates, the branch circuit 27 and 28 is designed to provide 20 kilovolts at 15 amperes and this pulse amplitude is indicated by waveform 33 in FIG. 6. Employing the equation $E=IR$ the calculated resistance of 20 kilovolts at 15 amperes will be 1330 ohms and since only 15 kilovolts at 15 amperes or 1000 ohms is required for the magnetron oscillator the series connected resistor 28 value will be 330 ohms. This value will assure that during the rise of the voltage pulse no current is drawn through the resistor 28 until the magnetron oscillator reaches the oscillation stage which occurs at approximately 60 percent of the amplitude of the full voltage passed through the secondary transformer winding 27. As the magnetron commences operation and draws cathode current through the resistor the voltage drop across this component increases until the magnetron oscillator is drawing full peak current and all the excess voltage or approximately 5 kilovolts appears across the resistor.

In a like manner the characteristics for the first amplifier which may be of the amplitron type are determined from curve 31 to be approximately 32 kilovolts at 35 amperes. A voltage pulse of 40 kilowatts at this current value is preferred from the branch circuit including secondary transformer winding 26 and resistor 29. The computed value of this latter component will be 140 ohms since the voltage pulse as indicated in waveform 34 of FIG. 6 will be 40 kilovolts at a current of 35 amperes to result in an overdriving voltage pulse on the amplifier of 35 kilovolts.

The final stage amplifier in the illustrative RF chain has a starting voltage requirement of 56 kilovolts and 60 amperes of current as indicated in curve 32 of FIG. 5. A voltage pulse of 60 kilovolts will result in a resistance value of 1,000 ohms and since this is the last component in the chain the full voltage pulse will be employed to commence operation of this amplifier. If a succeeding stage were provided than a series resistor to control the initiation of its operation would be required.

The impedance of the pulse forming network 22 of the voltage-fed type is fixed and the voltage appearing across a load such as the pulse coupling network 23 will be approximately equal to one-half the voltage which is available from a power supply. Most line-type pulsers in use today operate with 20 kilovolt and 10 ampere supplies and, therefore, 10 kilovolts at 10 amperes will be available across the primary inductance winding 24. With a twenty turn primary winding it will be possible to calculate the necessary stepup increments in the bifilar secondary windings to achieve the previously calculated voltage requirements for the respective coupled loads. The total voltage pulse of 60 kilovolts will result in a primary-to-secondary ratio of 6:1 or one hundred and twenty turns for winding 25. The preceding stage coupled through the branch circuit including secondary 26 requires a 40 kilovolt pulse and a turns ratio of 4:1 or eighty turns for secondary inductance 26. The oscillator which has a requirement of 20 kilovolts will necessitate a 2:1 ratio or a forty turn winding for secondary inductance 27.

The current provided in the respective branch circuits is also now known and is respectively 15, 35 and 60 amperes. The primary resistance value may then be calculated utilizing the turns ratio values of 2:1, 4:1 and 6:1 to result in a total current requirement of 540 amperes. The primary winding 24 then will have a resistance of 18.5 ohms at the 10 kilovolt voltage rating.

The inherent overlap of the RF pulses resulting from the combined multiple impedance load of oscillators and amplifiers is indicated in the substantially trapezoidal waveform 36 in FIG. 7 having a stepped leading and trailing edge of reducing time duration.

The pulse width of the first stage or oscillator is 2.2 microseconds and that of the second stage or amplifier is 2.1 microseconds. The final amplifier will have a pulse duration of 2.0 microseconds. The combined RF output pulse will be radiated by a conventional antenna system of a radar system.

The invention therefore discloses an efficient pulse coupling network utilizing the operating and impedance characteristics of each component of an RF chain system and simultaneously from a single pulse power source providing an overlapping voltage pulse of proper amplitude, width and impedance to operate the combined load. Since only one pulser or modulator is required, correction for time base jitter is no longer necessary as is heretofore inherent in conventional multi-modulator systems. In addition, the careful control of the RF drive pulses for each component of the chain assures the elimination of mode skipping in a magnetron oscillator and also provides for operation of the tubes at less average power than that required with individual modulators.

Numerous combinations of oscillator and amplifier microwave tubes may be utilized including the use of traveling wave tubes together with klystrons or any combination thereof. Many modifications or alternative embodiments may also be evident to skilled artisans. The foregoing detailed description and specific illustrations herein contained, therefore, are intended as exemplary only without in any manner limiting the scope and breadth of the invention as defined in the accompanying claims.

What is claimed is:

1. A pulsed electrical energy transfer system for supplying high power high voltage electrical pulses to multiple high frequency signal generators comprising:
- a source of electrical energy;
- pulse generation and modulation means;
- a multiple output load;
- means electrically coupling the generated voltage pulses to said multiple output load;
- said coupling means comprising a transformer having a primary winding and a plurality of bifilar wound mutually electrically isolated secondary windings inductively coupled to said primary winding;
- each of said secondary windings being individually connected to a component of said multiple output load;
- and variable current control means serially connected between selected of said secondary windings and output loads to regulate the voltage pulse amplitude applied across each of said output load components.

2. A pulse electrical energy transfer system according to claim 1 wherein each of said secondary windings bears a different turns ratio to the primary winding based on the voltage pulse amplitude value required to initiate operation of each component of the multiple output load.

3. A pulse electrical energy transfer system according to claim 1 wherein the characteristics of the secondary winding and series connected current control means are selected to match the selected voltage and impedance characteristics of the respective components of the multiple output load coupled thereto.

4. A pulsed electrical energy transfer system for supplying high power high voltage electrical pulses to multiple microwave frequency signal generators comprising:
- a source of electrical energy;
- pulse generation and modulation means;
- a multiple output load including in series a plurality of microwave oscillator and amplifier devices;
- means electrically coupling the generated voltage pulses simultaneously to each component of said multiple output load;
- said coupling means comprising a circuit network including a transformer having a primary winding and a plurality of bifilar wound mutually electrically isolated secondary windings inductively coupled to said primary winding;

and variable resistors serially connected in selected of said network secondary winding branches to regulate the voltage pulse amplitude applied across each of said multiple output load components.

5. A pulsed electrical energy transfer system according to claim 4 wherein each of said secondary windings and series resistors have a voltage and impedance characteristic determined by the respective voltage and impedance characteristics of the oscillator and amplifier devices coupled thereto.

6. A pulsed electrical energy transfer system according to claim 4 wherein the voltage and impedance characteristics of the secondary windings and series resistors are selected to provide a voltage pulse in excess of a predetermined value to result in generation of microwave frequency output pulses in each preceding component of the output load before the succeeding component reaches the operative level.

7. In a microwave frequency pulsed radar system transmitter, means for simultaneously supplying high power high voltage electrical energy to multiple microwave frequency signal generators comprising:

a source of electrical energy;

a single line-type pulse generation and modulation means;

a multiple output load including a chain of interconnected microwave frequency oscillator and amplifier means to provide a combined output signal pulse;

means electrically transforming the generated voltage pulses to different voltage and impedance characteristics determined in the output chain;

said transformation means including a transformer having a primary winding and a plurality of bifilar wound mutually electrically isolated secondary windings indirectly coupled to said primary winding in branch circuits electrically connected to each component of said output chain;

each of said secondary windings having a different turns ratio to the primary winding to provide a voltage pulse in excess of the requirements to initiate operation of the respective components of the output chain;

and varying resistance means serially connected in selected of said branch circuits to control the voltage and current operating requirements for each component of said output chain.

No references cited.

RODNEY D. BENNETT, *Primary Examiner.*

C. L. WHITHAM, *Assistant Examiner.*